3,748,178
ELECTROCHEMICAL GENERATOR OF THE SULPHUR-SODIUM TYPE
Jacques Fally, Orsay, Yvon Lazennec, Saint-Michel-sur-Orge, and Claude Lasne, Antony, France, assignors to Compagnie Generale d'Electricite, Paris, France
Filed Oct. 22, 1971, Ser. No. 191,705
Claims priority, application France, Oct. 30, 1971, 7039319
Int. Cl. H01m
U.S. Cl. 136—6 F
12 Claims

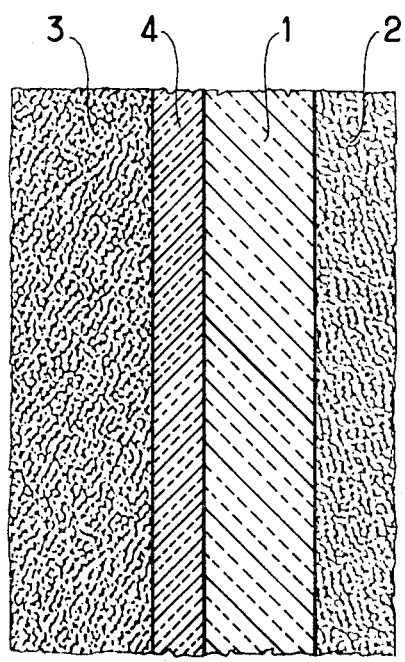

ABSTRACT OF THE DISCLOSURE

A highly porous, thin layer of electrically insulative material separates the positive active material impregnated electronic conductive material from the solid electrolyte in a rechargeable electrochemical generator of the sulphur-sodium type.

BACKGROUND OF THE INVENTION

Field of the invention

The invention relates to rechargeable electrochemical generators of the sulphur-sodium type, wherein the positive active material impregnates an electronic conductive material and is separated from the negative active material, in the fused state at the generator functioning temperatures, by a solid electrolyte.

Description of the prior art

By way of example, the positive active material may be selected from the group constituted by sulphur, phosphorus, selenium and the alkaline salts of these substances. The negative active material may be selected from the alkaline metals. The electrolyte may be sodium beta alumina. The electronic conductive material may be carbonaceous; it may be selected from the group constituted by the graphite felts, the graphite fibers, graphite powder.

Applicants have ascertained that, frequently, such generators are able to withstand only a limited number of charging and discharging cycles, for example, of the order of 60, due to the appearance of electronic conduction within the electrolyte.

Thus, in the case of generators employing sulphur and sodium as positive and negative active materials and sodium beta alumina as electrolyte, such conduction appears to be due to the presence of microfissures in which the metallic sodium becomes lodged.

There follows, notably on charging, the creation of shunts which prevent the sodium from returning into the negative compartment.

It appears that the microfissures are due to electrolysis taking place during the charging of the sodium beta alumina, due to defective supply of sodium extracted from the polysulphides formed on discharge, at the level of the contacts between the electronic conductive material and the sodium beta alumina.

The present invention makes it possible, notably to remedy these disadvantages and to obtain generators which are capable of withstanding a very much higher number of charging/discharging cycles, for example higher than 300.

SUMMARY OF THE INVENTION

The invention relates to a rechargeable electrochemical generator of the sulphur-sodium type, wherein the positive active material impregnates an electronic conductive material and is separated from the negative active material, in the fused state at the functioning temperatures of the generator, by a solid electrolyte. The invention is characterized in that conductive material is separated from the solid electrolyte by a layer of an electrically insulating material, said layer being thin and having a considerable degree of open porosity, so as not to introduce any noteworthy disturbance into the ion exchange taking place within the generator.

DESCRIPTION OF THE PREFERRED EMBODIMENT

The porosity of the insulating layer must be considerable, so that said layer may be uninterruptedly impregnated throughout its thickness, in order to ensure ion conductivity. For this purpose, it is desirable that the porosity level of said layer should be at least 50%. Furthermore, in order that the increase in electrical resistance, due to said layer, shall not disturb the ion exchanges to any considerable degree, it is necessary that the thickness of said layer should be as small as possible, whilst remaining compatible with effective insulation from the viewpoint of the electronic contacts. The layer may also have a thickness of a few tens of microns, for example approximately 50 microns.

The presence, according to the invention, of the insulating layer between the solid electrolyte and the electronic conductive material prevents the electrolyte from undergoing electrolysis during charging, due to the fact that the electrode reactions are transferred to the interface between said conductive material and said insulating layer.

If follows that no microfissures form within the electrolyte and that, consequently, the generator is capable of undergoing numerous charging/discharging cycles.

By way of entirely non-limitative example, said layer may be constituted by alpha alumina. The dimensions of the pores of said layer may be smaller than 10 microns. The alpha alumina has, notably, the advantage that it adheres very strongly to the sodium beta alumina.

The layer of alpha alumina may be formed by projection on the electrolyte, heated up to approximately 300–400° C., of a solution of an aluminum salt, for example an aqueous solution of aluminum chloride, optionally containing a little hydrochloric acid. The salt thus projected decomposes on the heated electrolyte and yields alumina. There is then advantageously effected heat treatment, in contact with the air, at approximately 900–1000° C.

The layer may also be constituted by a glass fabric or a ceramic felt.

The positive and negative active materials, the electrolyte and the electronic conductive material may be constituted as indicated hereinabove. The alkaline metal may be in the free state or in amalgamated form.

The single figure shows, extremely diagrammatically and by way of example, a mode of embodiment according to the invention.

The solid electrolyte of sodium beta alumina is designated by reference numeral 1.

The negative compartment of the generator comprises the negative active material 2, which is metallic sodium, at the generator functioning temperatures in the fused state.

The positive compartment contains a graphite felt 3 constituting the electronic conductive material and impregnated with the positive active material, sulphur or a mixture of sulphur and sodium polysulphide.

Reference numeral 4 designates the porous insulating layer spacing, according to the invention, the electrolyte 1 from the material 3.

Due to the presence according to the invention of means preventing any electrolysis of the electrolyte, it is possible to subject the generators to more rapid charging. Furthermore, limitation of the charging voltage also no longer appears to be necessary.

It has, furthermore, been observed that an arrangement of this kind increases the discharge depth, this being as much as to say that, on recharging, in the case of a generator utilizing sulphur and sodium as positive and negative active materials, it becomes possible to exceed the stage $Na_2S_5$ in the positive compartment, so as to almost attain the sulphur state In fact, in the insulating porous layer there still remain polysulphides which have not decomposed in respect of sulphur, thus ensuring ion conduction.

Of course, the invention is in no way limited to the modes of embodiment described, which have been given purely by way of example. In particular, it would be possible without exceeding the scope of the invention to provide modifications as to detail, to change certain arrangements or to replace certain means by equivalent means.

What is claimed is:

1. In a rechargeable electrochemical generator of the sulphur-sodium type comprising, at the functioning temperature:
   a solid electrolyte wall,
   a solid electronically conductive material exhibiting an open porosity on one side of said electrolyte wall,
   a liquid positive active material impregnating said conductive material,
   a liquid negative active material on the other side of said electrolyte wall, the improvement comprising:
   a thin layer of an electrically insulating material exhibiting a high degree of open porosity coating one side of said electrolyte wall and spacing said conductive material from said electrolyte wall.

2. The generator according to claim 1, wherein: said thin layer of an electrically insulating material has a thickness of 50 microns.

3. The generator according to claim 1, wherein: the porosity level of said thin layer of an electrically insulating material is at least 50%.

4. The generator according to claim 1, wherein: the solid electrolyte wall is sodium beta alumina.

5. The generator according to claim 1, wherein: the insulating layer is constituted by alpha alumina.

6. The generator according to claim 5, wherein: the dimensions of the pores of the insulating layer are below 10 microns.

7. The generator according to claim 1, wherein: the insulating layer comprises a glass fabric.

8. The generator according to claim 1, wherein: the insulating layer comprises a ceramic felt.

9. The generator according to claim 1, wherein: the positive active material comprises one material selected from the group consisting of sulphur, phosphorus, selenium and the alkaline salts of these substances.

10. The generator according to claim 1, wherein: the negative active material comprises an alkaline metal.

11. The generator according to claim 1, wherein: the electronic conductive material is carbonaceous.

12. The generator according to claim 11, wherein: the electronic conductive material comprises one material selected from the group consisting of graphite fibers and graphite powder.

References Cited
UNITED STATES PATENTS

| Patent | Date | Inventor | Class |
|---|---|---|---|
| 3,404,035 | 10/1968 | Kummer et al. | 136—6 |
| 3,404,036 | 10/1968 | Kummer et al. | 136—6 |
| 3,463,670 | 8/1969 | Rao et al. | 136—83 R |
| 3,531,324 | 9/1970 | Fischer et al. | 136—20 |
| 3,672,994 | 6/1972 | Mitoff | 136—83 R |
| 3,607,435 | 9/1971 | Charles et al. | 136—153 |

ANTHONY SKAPARS, Primary Examiner

U.S. Cl. X.R.

136—83 R